Figures 1, 2:
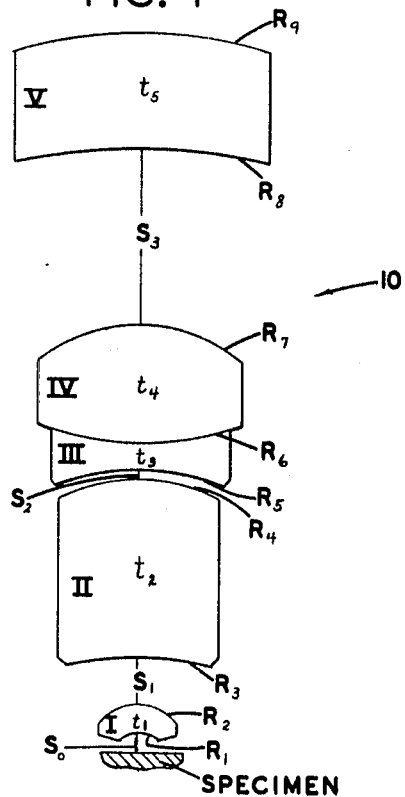

April 5, 1966     N. RICKLESS ETAL     3,244,074

FOUR COMPONENT MICROSCOPE OBJECTIVE

Filed April 23, 1964

| E.F. = 10.41 mm. | | N.A. = 0.4 | | MAGNIFICATION 20 X | | |
|---|---|---|---|---|---|---|
| LENS | RADII | THICK-NESSES | SPACES | FOCAL LENGTHS | $n_D$ | $v$ |
| I | $R_1 = -1.445$ | $t_1 = 1.3$ | $S_0 = 0.54$ | $F_1 = 13.19$ | 1.691 | 54.8 |
| | $R_2 = -1.706$ | | | | | |
| II | $R_3 = -15.560$ | $t_2 = 6.7$ | $S_1 = 2.0$ | $F_2 = 22.68$ | 1.623 | 56.9 |
| | $R_4 = -8.629$ | | | | | |
| III | $R_5 = -14.454$ | $t_3 = 1.0$ | $S_2 = 0.1$ | $F_3 = -9.118$ | 1.805 | 25.4 |
| | $R_6 = +14.454$ | | | | | |
| IV | $R_7 = -7.3114$ | $t_4 = 4.3$ | | $F_4 = 10.07$ | 1.517 | 64.5 |
| V | $R_8 = -86.298$ | $t_5 = 4.2$ | $S_3 = 6.7$ | $F_5 = 44.64$ | 1.575 | 41.4 |
| | $R_9 = -20.137$ | | | | | |

PAUL L. RUBEN
NATHAN RICKLESS
*INVENTORS*

BY *Frank C. Parker*

ATTORNEY

3,244,074
FOUR COMPONENT MICROSCOPE OBJECTIVES
Nathan Rickless, Brighton, and Paul L. Ruben, Rochester, N.Y., assignors to Bausch & Lomb Incorporated, Rochester, N.Y., a corporation of New York
Filed Apr. 23, 1964, Ser. No. 363,672
3 Claims. (Cl. 88—57)

This application is a continuation-in-part of our prior application Serial No. 200,815, filed June 7, 1962, now abandoned.

The present invention relates to microscope objectives of medium power which are particularly adapted to use in metallurgical work and more particularly relates to improvements therein.

It is an object of this invention to provide a microscope objective of relatively short focal length, numerical aperture of 0.4, and medium power which produces a flat field and has a performance which is substantially diffraction limited over the entire visible field of 20 mm. diameter in the eyepiece focal plane.

It is a further object of this invention to provide such a device which is simple in construction and of low cost but nevertheless capable of high grade performance and is designed to transmit a minimum of 50% of the reflected meridional ray fan at the edge of the field.

Further objects and advantages will be apparent to those skilled in this art from a study of the specification hereafter taken in connection with the accompanying drawing, wherein:

FIG. 1 is an optical diagram of an optical system for a microscope objective constructed according to the present invention; and FIG. 2 is a chart of constructional values related to the objective illustrated in FIG. 1.

In the form of the invention shown in the drawing the microscope objective is generally designated by the numeral 10 and said objective has a magnification of substantially 20× and a numerical aperture of substantially 0.4 together with an advantageously flat field and a substantially diffraction limited performance over the entire visible field.

According to this invention the objective 10 comprises four lens members in optical alignment with each other, said lens members including a front convex-concavo singlet meniscus lens I. Optically aligned and spaced rearwardly therefrom is a second convex-concavo thick meniscus singlet lens II. Still further rearwardly spaced from the second convex-concavo lens is a compound convex-concavo lens composed of a front double concave lens element III which is in contact with a rear double convex lens element IV. In rearmost position in the objective 10 is another convex-concavo singlet meniscus lens V spaced from the compound lens. The concavo sides of all of the lenses aforementioned face the front side of the objective 10.

Important advantages are obtained regarding low cost of manufacture and assembly as well as simplification of assembly, by forming both refractive surfaces of the double concave lens element III of equal curvature.

For the proper attainment of the objects of this invention the focal lengths of the successive convex-concavo lens members which are designated $F_1$, $F_2$, $F_{3D}$ and $F_5$ have values which are numerically as stated in the table below, along with the values of the focal lengths $-F_3$ and $F_4$ which are related respectively to negative lens element III and positive lens element IV of said compound lens, wherein F designates the focal length of the objective 10, and wherein $F_{3D}$ designates the focal length of said compound lens.

$1.14F < F_1 < 1.38F$
$1.96F < F_2 < 2.38F$
$7.20F < F_{3D} < 8.80F$
$-F_3 = .876F$ substantially
$F_4 = .967F$ substantially
$3.86F < F_5 < 4.70F$ wherein the minus (—) sign signifies negative focal length.

Furthermore, it has been found advantageous in the attainment of the objects of this invention to assign radius absolute values of the refractive surfaces of the said lenses $R_1$ to $R_9$ as given in the following table of ratios.

$$.76 < \frac{R_1}{R_2} < .93$$

$$1.62 < \frac{R_3}{R_4} < 1.98$$

$$1.78 < \frac{R_5}{R_7} < 2.18$$

$$3.85 < \frac{R_8}{R_9} < 5.71$$

Along with the specified values of radii, the values for thicknesses $t_1$ to $t_5$ related to the successive thicknesses of the various lenses should be specified as indicated in the table herebelow.

$.112F < t_1 < .137F$
$.578F < t_2 < .710F$
$.086F < t_3 < .106F$
$.372F < t_4 < .454F$
$.363F < t_5 < .443F$

Stated in another manner, the constructional data for the optical system 10 may be stated by the mathematical expressions given in the table herebelow wherein $R_1$ to $R_9$ represent the radii of the refractive surfaces of the successive lenses, the minus (—) sign denoting those surfaces which are concave toward the front of the optical system.

$.124F < -R_1 < .152F$
$.148F < -R_2 < .180F$
$1.344F < -R_3 < 1.642F$
$.744F < -R_4 < .910F$
$1.249F < -R_5 < 1.525F$
$1.249F < +R_6 < 1.525F$
$.632F < -R_7 < .772F$
$7.46F < -R_8 < 9.10F$
$1.74F < -R_9 < 2.13F$

The corresponding successive air spaces between the component lenses of the system are designated $S_1$ to $S_3$ and are given in the table of mathematical expressions herebelow, $$.17F < S_1 < .21F$$
$$.0087F < S_2 < .0106F$$
$$.58F < S_3 < .71F$$

The values of the refractive index $n_D$ and Abbé number $\nu$ for the successive lenses mentioned hereabove are given in the table of ranges herebelow, $$1.685 < n_D(I) < 1.695$$
$$1.617 < n_D(II) < 1.630$$
$$1.795 < n_D(III) < 1.810$$
$$1.515 < n_D(IV) < 1.520$$
$$1.570 < n_D(V) < 1.580$$

$$52.0 < \nu(I) < 57.0$$
$$54.0 < \nu(II) < 59.0$$
$$23.0 < \nu(III) < 28.0$$
$$62.0 < \nu(IV) < 67.0$$
$$40.0 < \nu(V) < 43.0$$

It has been found that specific values of one successful form of the invention may advantageously be specified according to the tables appearing herebelow wherein the designation for lens radii together with refractive indices and Abbé numbers are as given herebelow, $$-R_1 = .139F$$
$$-R_2 = .164F$$
$$-R_3 = 1.493F$$
$$-R_4 = .828F$$
$$-R_5 = 1.387F$$
$$+R_6 = 1.387F$$
$$-R_7 = .702F$$
$$-R_8 = 8.28F$$
$$-R_9 = 1.936F$$

$$n_D(I) = 1.691$$
$$n_D(II) = 1.623$$
$$n_D(III) = 1.805$$
$$n_D(IV) = 1.517$$
$$n_D(V) = 1.575$$

$$\nu(I) = 54.8$$
$$\nu(II) = 56.9$$
$$\nu(III) = 25.4$$
$$\nu(IV) = 64.5$$
$$\nu(V) = 41.4$$

In order to simplify the optical construction of the objective 10 and reduce the cost thereof, the lens element III is provided with double concave surfaces which have radii that are numerically equal to each other. This fact in addition to the maintenance of lens surfaces having relatively flat curvatures tends to provide an optical system of least cost.

The distance $S_0$ from the front lens I to the specimen plane has a value of .0518F where F is the equivalent focus of the entire objective.

In the chart of constructional data appearing in FIG. 2 of the drawing and as given herebelow, the detailed dimensional specifications of one successful form of the invention are given.

[E.F. = 10.41 mm.  N.A. = 0.4  Magnification = 20X]

| Lens | Radii | Thicknesses | Spaces | Focal length | $n_D$ | $\nu$ |
|------|-------|-------------|--------|--------------|-------|-------|
| I    | $R_1 = -1.445$<br>$R_2 = -1.706$ | $t_1 = 1.3$ | $S_0 = 0.54$<br>$S_1 = 2.0$ | $F_1 = 13.19$ | 1.691 | 54.8 |
| II   | $R_3 = -15.560$<br>$R_4 = -8.629$ | $t_2 = 6.7$ |  | $F_2 = 22.68$ | 1.623 | 56.9 |
| III  | $R_5 = -14.454$<br>$R_6 = +14.454$ | $t_3 = 1.0$ | $S_2 = 0.1$ | $F_3 = -9.118$ | 1.805 | 25.4 |
| IV   | $R_7 = -7.3114$ | $t_4 = 4.3$ |  | $F_4 = 10.07$ | 1.517 | 64.5 |
| V    | $R_8 = -86.298$<br>$R_9 = -20.137$ | $t_5 = 4.2$ | $S_3 = 6.7$ | $F_5 = 44.64$ | 1.575 | 41.4 |

Although only certain forms and arrangements of the present invention are shown and described in detail, it will be understood that other forms and arrangements are possible and changes may be made in the detailed structure of the parts thereof without departing from the spirit of the invention as defined in the claims here appended.

We claim:

1. A microscope objective having a magnification of substantially 20X and a numerical aperture of substantially 0.40, said objective having a flat field and a substantially diffraction limited performance, said objective having in optical alignment, a front positive singlet meniscus lens located on the object side of the objective, the steeper curved refractive surface thereof being concave and facing said object side, a second positive singlet thick meniscus lens which is concave toward the front lens and is spaced rearwardly therefrom, the rear surface thereof being convex and having the steeper curvature, a third positive meniscus lens which is spaced rearwardly from and is concave toward the second lens, said lens being compound and being composed of a front double concave element in contact with a rear double convex element, and a rearmost positive singlet meniscus lens which is spaced from the third lens and is concave thereto, the rear surface thereof being convex and having the steeper curvature, the values of the constructional data for said objective being given in the mathematical statements herebelow wherein $R_1$ to $R_9$ denote the successive lens surfaces numbering from the front thereof, $t_1$ to $t_5$ designate the axial thicknesses of the successive lens elements, and $S_1$ to $S_3$ designate the successive air spaces between the lenses, F designates the equivalent focus of said objective, the minus (—) sign designating those surfaces which are concave toward the front, $n_D$ and $\nu$ denote the refractive index and Abbé number, $$-R_1 = .139F$$
$$-R_2 = .164F$$
$$-R_3 = 1.493F$$
$$-R_4 = .828F$$
$$-R_5 = 1.387F$$
$$+R_6 = 1.387F$$
$$-R_7 = .702F$$
$$-R_8 = 8.28F$$
$$-R_9 = 1.936F$$

$$n_D(I) = 1.691$$
$$n_D(II) = 1.623$$
$$n_D(III) = 1.805$$
$$n_D(IV) = 1.517$$
$$n_D(V) = 1.575$$

$t_1 = .125F$
$t_2 = .642F$
$t_3 = .096F$
$t_4 = .413F$
$t_5 = .403F$
$S_1 = .192F$
$S_2 = .00962F$
$S_3 = .644F$ $\nu(I) = 54.8$
$\nu(II) = 56.9$
$\nu(III) = 25.4$
$\nu(IV) = 64.5$
$\nu(V) = 41.4$

2. A microscope objective as set forth in claim 1 wherein the distance of the objective from the specimen plane has a value of .0518F substantially.

3. A microscope objective having a flat field and substantially diffraction limited performance as set forth in the table herebelow wherein Roman numerals I–V designate the successive lens elements, F to $F_5$ denote the focal lengths of the successive elements, $R_1$ to $R_9$ represent the radii of the successive lens surfaces, $R_6$ being a cemented interface, $t_1$ to $t_5$ denote the axial thicknesses of the elements, $S_1$ to $S_3$ denote the successive axial air spaces, and $n_D$ and $\nu$ represent the refractive indices and Abbé numbers respectively of the elements,

[E.F. = 10.41 mm.  N.A. = 0.4  Magnification = 20×]

| Lens | Radii | Thicknesses | Spaces | Focal length | $n_D$ | $\nu$ |
|---|---|---|---|---|---|---|
| I | $R_1 = -1.445$ <br> $R_2 = -1.706$ | $t_1 = 1.3$ | $S_0 = 0.54$ <br> $S_1 = 2.0$ | $F_1 = 13.19$ | 1.691 | 54.8 |
| II | $R_3 = -15.560$ <br> $R_4 = -8.629$ | $t_2 = 6.7$ |  | $F_2 = 22.68$ | 1.623 | 56.9 |
| III | $R_5 = -14.454$ <br> $R_6 = +14.454$ | $t_3 = 1.0$ | $S_2 = 0.1$ | $F_3 = -9.118$ | 1.805 | 25.4 |
| IV | $R_7 = -7.3114$ | $t_4 = 4.3$ |  | $F_4 = 10.07$ | 1.517 | 64.5 |
| V | $R_8 = -86.298$ <br> $R_9 = -20.137$ | $t_5 = 4.2$ | $S_3 = 6.7$ | $F_5 = 44.64$ | 1.575 | 41.4 |

No references cited.

DAVID H. RUBIN, *Primary Examiner.*

JOHN K. CORBIN, JEWELL H. PEDERSEN,
*Examiners.*